Figure 10:
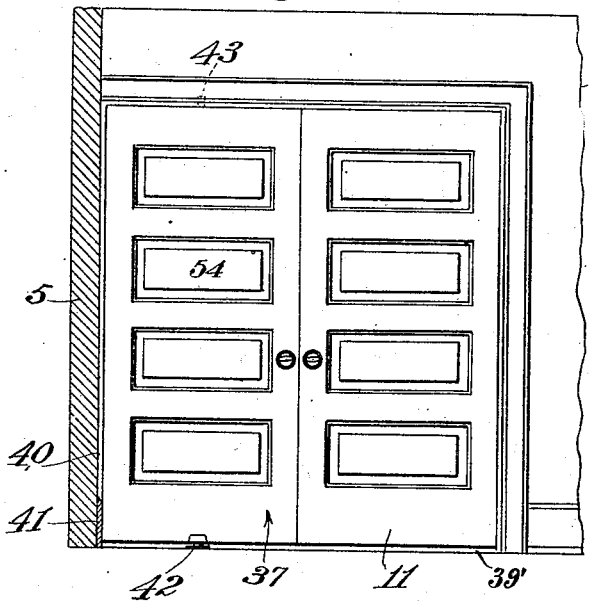

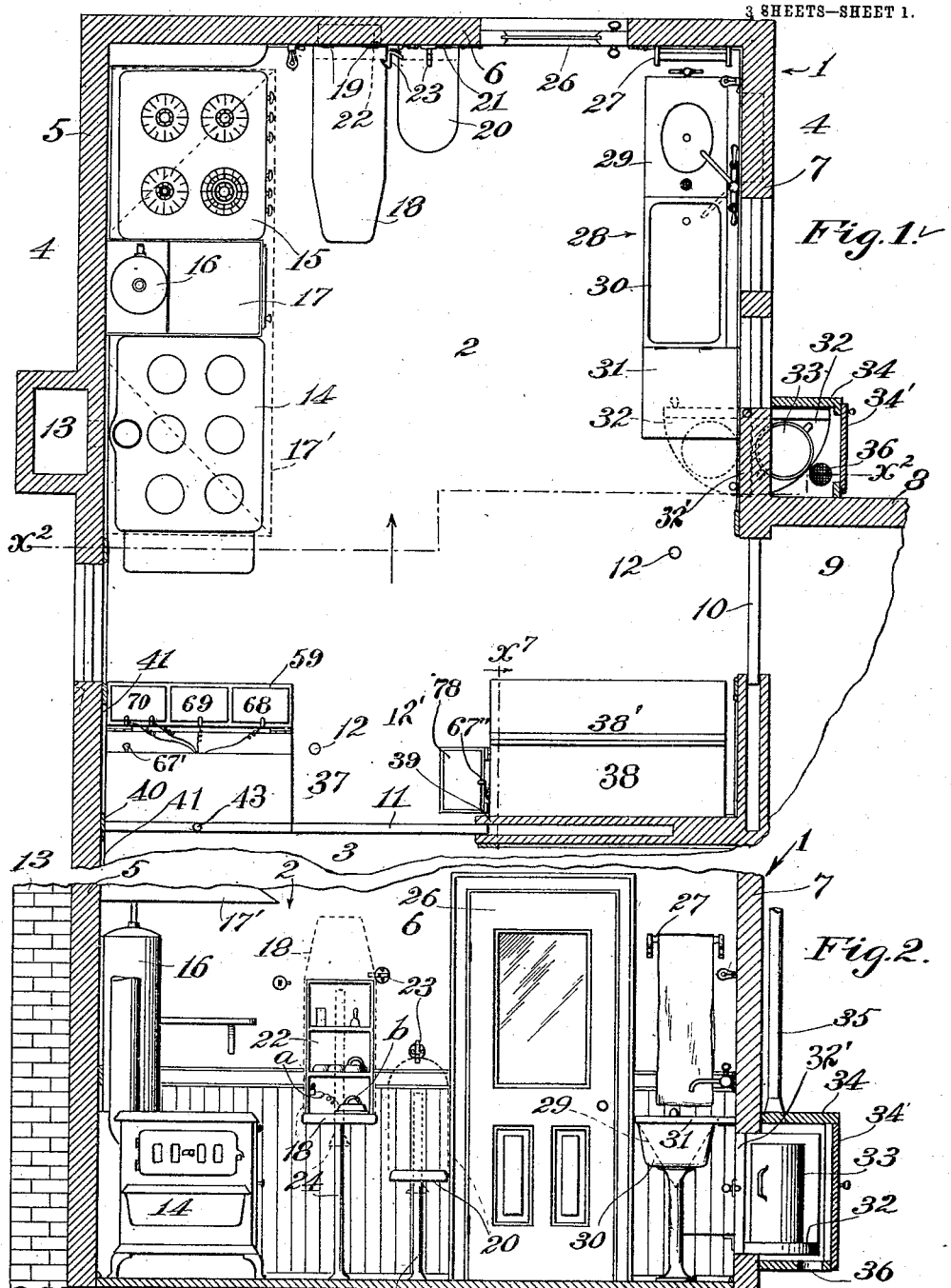

No. 828,481. PATENTED AUG. 14, 1906.
W. C. JAMES.
KITCHEN AND ADJUNCTS THERETO.
APPLICATION FILED JULY 31, 1905.
3 SHEETS—SHEET 2.
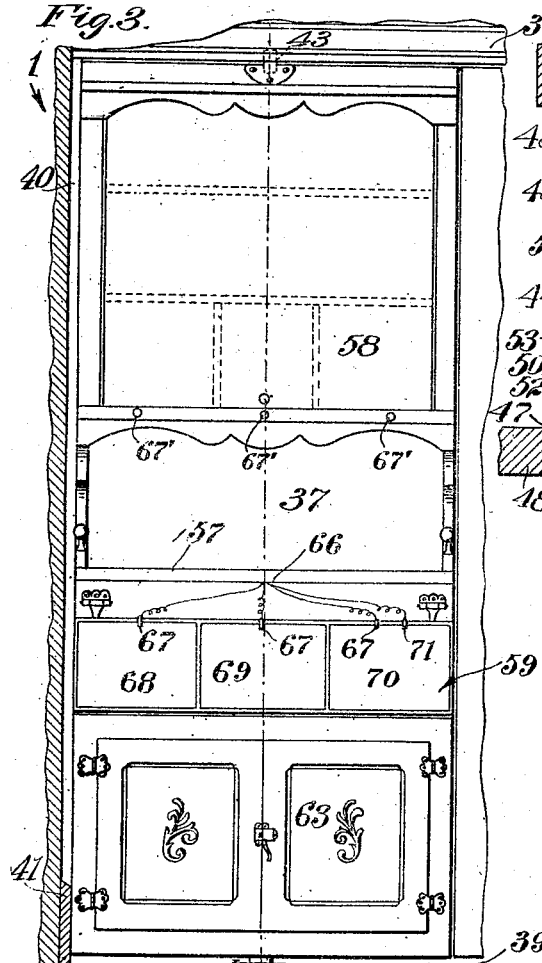
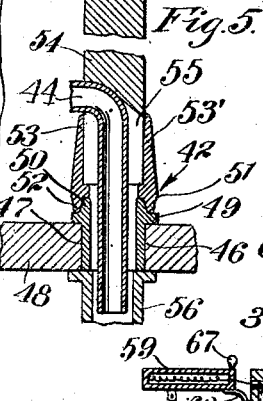
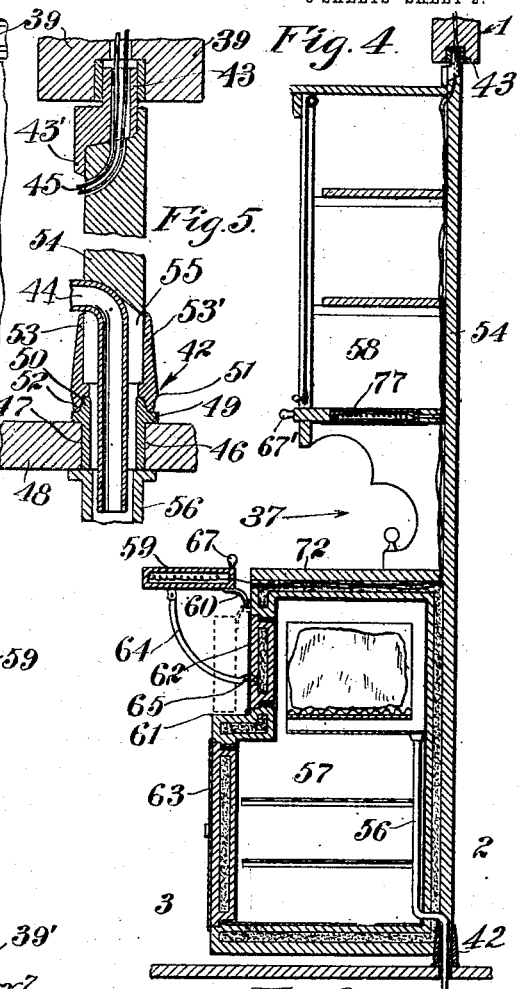
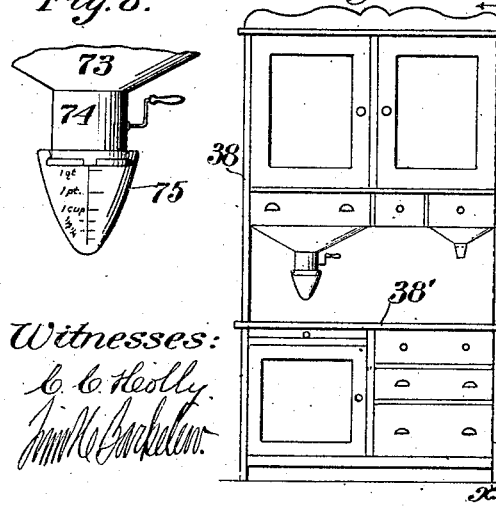
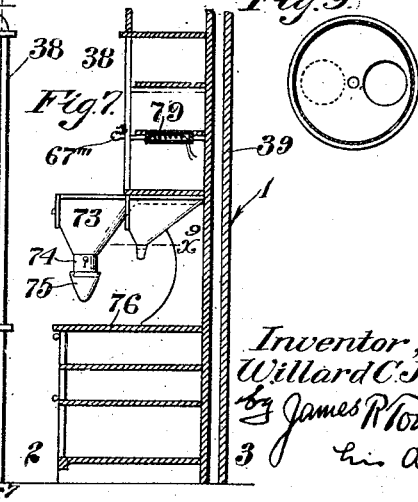
Witnesses:
Inventor;
Willard C. James.

No. 828,481. PATENTED AUG. 1906.
W. C. JAMES.
KITCHEN AND ADJUNCTS THERETO.
APPLICATION FILED JULY 31, 1905.

3 SHEETS—SHEET 3

Witnesses:

Inventor,
Willard C. James.
by James R. Townsend
his Atty

UNITED STATES PATENT OFFICE.

WILLARD C. JAMES, OF LOS ANGELES, CALIFORNIA.

KITCHEN AND ADJUNCTS THERETO.

No. 828,481.  Specification of Letters Patent.  Patented Aug. 14, 1906.

Application filed July 31, 1905. Serial No. 271,892.

*To all whom it may concern:*

Be it known that I, WILLARD C. JAMES, a citizen of the United States, residing at Los Angeles, in the county of Los Angeles and State of California, have invented new and useful Improvements in Kitchens and Adjuncts Thereto, of which the following is a specification.

It is one of the objects of this invention to simplify, make easy, and reduce to a minimum the work of the housewife.

Other objects are superior sanitation, service, and economy of time.

The invention is applicable to apartment-houses, cottages, club-houses, and other buildings and includes a construction appertaining to the kitchen and to the dining-room and pantry adjoining the kitchen.

An object of the invention is to provide a kitchen peculiarly adapted for apartment-houses or cottages where the housewife or maid attends on both kitchen and dining-room and in which the kitchen is also used as a laundry and household-lavatory.

A further object of the invention is to so construct and arrange a kitchen and its adjuncts as to avoid as much as possible any damage, inconvenience, or discomfort from the heat of heating-appliances necessary in the kitchen. In this connection the kitchen is provided at one end with laundry and heating and cooking appliances, (which may include electrical heaters and gas and wood and coal burning devices,) while the garbage-receptacle and the pantry are removed across the room from the heating appliances, the devices employed for ironing in the laundry being arranged at the end of the room opposite the dining-room and close to an electrical heater or gas-range. At the end of the kitchen-apartment opposite the laundry and ironing appliances I provide a revoluble device adapted to facilitate serving both hot and cold articles of food, the same comprising a reversible pivoted panel in the nature of a door to form a section of the partition between the dining-room and kitchen apartments, and adjoining thereto I provide a door of equal dimensions forming another section of said partition to close against the pivoted door, so that the two doors give the appearance of double or folding doors. On one side of the reversible pivoted panel or door I rigidly mount a refrigerator or ice-chest, china-closet, and hot-plate, and thus provide these conveniences for both the kitchen and dining-room alternatively.

This invention comprises a kitchen-apartment having along a portion of one side an outside wall provided with a garbage-can opening; a pantry-apartment along a portion of the same side and forming an angle with said outside wall; a dining-apartment along a side adjoining the pantry-apartment; doors spaced apart and communicating between the kitchen and the pantry and dining-room apartments, respectively; a kitchen-cabinet in the space between said doors; a shelf-space apart from the pantry-door; a revoluble garbage-can holder pivoted to swing below the shelf and below the space between the shelf and the pantry-door and through the garbage-can opening in the outside wall of the kitchen; a ventilated receptacle for the garbage-can holder arranged outside the kitchen; a combination lavatory, laundry, and culinary apparatus arranged along the same side of the kitchen with the shelf and garbage-can; one or more ranges with ventilating hood or cowl arranged on the side of the kitchen opposite the lavatory, laundry, culinary apparatus, and garbage-can opening; adjustable ironing apparatus arranged between a range and the laundry and culinary apparatus, and a revoluble device comprising an ice chest, hot-plate, and china-closet arranged in the corner of the kitchen between the last-named side of the kitchen and the dining-room and adapted to revolve to bring the front portion with hot-plate alternatively entirely inside the kitchen adjacent the ranges and the kitchen-cabinet or entirely inside the dining-room. The last-named revoluble device and the revoluble garbage-can holder are alike constructed with one side in the form of a panel or door to form a portion of the wall or partition in which they are mounted.

The accompanying drawings illustrate the invention.

Figure 11:
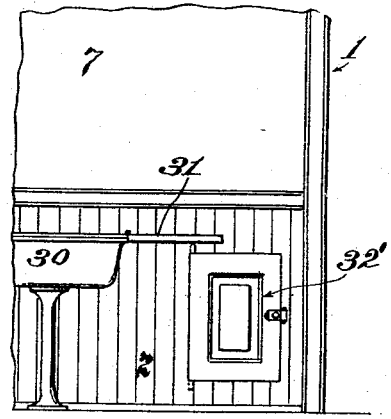
Figure 12:
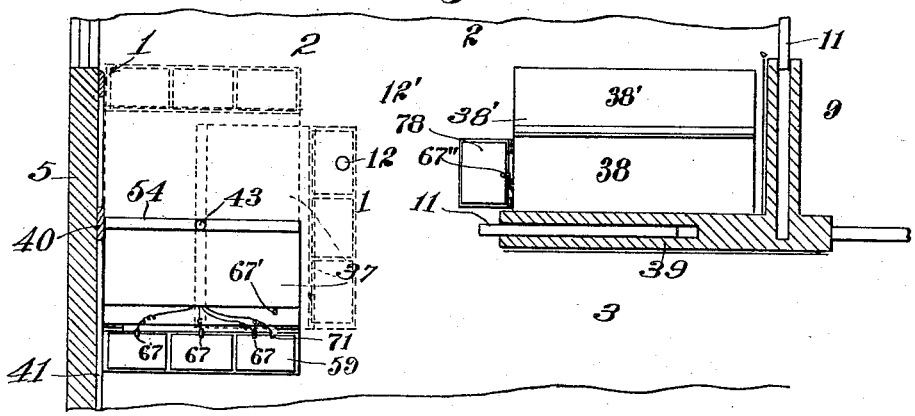

Figure 1 is a fragmental plan of an improved kitchen and adjuncts thereto embodying this invention. Dotted lines indicate a cowl below which the view is taken. Fig. 2 is a sectional elevation viewed from line $x^2$ $x^2$, Fig. 1, looking in the direction of the arrow. Fig. 3 is a fragmental elevation showing the revoluble device constituting a combined door, ice-chest, hot-plate, and china-closet swung into the dining-apartment. Fig. 4 is a vertical mid-section of the same on line $x^4$, Fig. 3. Fig. 5 is an enlarged fragmental detail in axial section, showing the pivot-mountings for the combined door, ice-chest, hot-plate, and china-closet. Fig. 6 is an elevation showing the front of the kitchen-cabinet. Fig. 7 is a vertical section of the same on line $x^7$, Figs. 1 and 6. Fig. 8 is a fragmental detached detail of the flour-sifter bin of the kitchen-cabinet. Fig. 9 is a sectional plan on line $x^9$, Fig. 7, showing the sugar-receptacle of the kitchen-cabinet. Fig. 10 is a fragmental elevation of the wall between the dining-room and kitchen apartment viewed from the dining-apartment side and showing the panel or door side of the revoluble device. Fig. 11 is a fragmental elevation of a portion of the wall of the kitchen, showing the panel of the garbage-can holder closing the opening in the wall through which said holder swings. Fig. 12 is a fragmental plan showing the ice-chest, hot-plate, and china-closet swung into the dining-room and the adjacent sliding door thrown open.

1, in a general way, designates the structure of the building forming the inclosing walls of the kitchen and the adjuncts thereto.

2 is the kitchen-apartment; 3, an adjoining dining-apartment, which may be used as a parlor and sitting-room.

4 is open space outside the structure.

5, 6, 7, and 8 designate exterior walls.

9 is a pantry.

10 and 11 are automatic sliding doors opening from the kitchen into the pantry and into the dining-room, respectively. 12 designates foot-operated devices for opening the sliding doors. 13 is a chimney of the building. Various heating means may be provided—as, for example, 14 is a wood and coal range, and 15 a gas or electric range. 16 is a hot-water tank; 17, a receptacle with shelves (not shown) for holding pots, pans, and kettles. 17' is a ventilating-cowl for the ranges. The respective parts above enumerated may be of any conventional or well-known form and construction adaptable for the purposes of this invention.

In front of the gas-range 15 is a combined ironing-board and table 18, hinged at 19 to the wall 6 to fold up out of the way.

20 is a seat hinged at 21 to extend alongside the table 18.

22 is a smoothing-iron closet in the wall 6, the same being supplied with electrical connections $a$ for electrical smoothing-irons $b$.

The table and ironing-board 18 is arranged to close the closet 22 when said table is folded up out of use.

23 designates elbow-catches of any well-known form for holding the ironing-board and table 18 and the seat 20 in position against the wall.

24 25 designate legs hinged to the ironing-board and seat, respectively, to sustain the same in horizontal position when let down for use.

26 is an outside door of the usual construction arranged to swing toward the seat and ironing-board.

27 is a towel-rack.

28 is a combined lavatory, laundry, and culinary apparatus located on the side of the kitchen opposite the ranges, the same comprising a revoluble device 29, a tub and sink 30, and a shelf or support 31 for preparing vegetables, meats, &c., from which preparation refuse may result.

32 is a swinging garbage-can holder and carrier containing a garbage-can 33, which may be brought to the end of the shelf 31 by swinging the carrier 32 into the kitchen and beneath the shelf.

34 is a garbage-can closet and ventilator, the same being located immediately outside the wall of the building and provided with a door 34', through which the garbage-can may be removed from the building. 35 is a ventilating-pipe leading up from the top, and 36 a screened ventilating-opening at the bottom of said closet.

37 is a revoluble device in which is combined a door, an ice-chest, a hot-plate, and a china-closet.

38 is a kitchen-cabinet between the pantry and dining-room doors and forming a support for dishes and food.

39 is a pocketed wall against which the kitchen-cabinet 38 stands and into which the door 11 slides, thus allowing the revoluble combined ice-chest, hot-plate, and china-closet 37 to swing around to present its front toward the kitchen-cabinet to receive articles therefrom and then to be swung around still farther into the dining-room apartment 3, where the articles are required for use.

40 is the jamb for the revoluble ice-chest, hot-plate, and china-closet, and 41 designates the base-boards or wainscoting of the dining-room and kitchen apartments, which serve as stops for the revoluble device 37.

Referring to Figs. 1, 3, 4, and 5, the combined ice-chest, hot-plate, and china-closet is mounted with clearance above the floor on pivots 42 43 to allow connections for drainage 44 and for electric wires 45, respectively. The lower pivot 42 may be formed of two parts, as shown, one being a flanged tubular base member 46, inserted into a hole 47 in the floor 48 and having a flange 49 resting on the floor and a collar 50 above the flange, and the other being a hollow member 51, resting on said base member and having a collar 52 fitting the collar 50 and also having two side plates 53 53' embracing the upright door or panel 54 of the revoluble device, which panel is provided between the plates with a notch 55, through which the drainage-pipe 44 is inserted into the top of the trap 56, leading to the sewer. The outer plate 53' hides the notch on the exposed side of the panel. The upper pivot 43 has a flange 43' to sustain the pressure of the panel. 57 is the refrigerator, and 58 the china-closet, mounted on the same side of the panel 54, which is mounted to carry the refrigerator into the kitchen and dining apartment alternatively. 59 is a hot-plate hinged at 60 to the refrigerator, which has a ledge 61 between the doors 62 63 of the refrigerator, above which ledge the hot-plate may be let down when not in use, as shown in dotted lines in Fig. 4. Segment-arms 64, each provided with a catch 65, are arranged to hold the hot-plate in position for use on a level with the top of the ice-chest and adapted to slip back and chamber in the wall of the refrigerator in a well-known way when the hot-plate is let down. 66 67 designate electrical connections and switches for supplying and controlling the current for heating the insulated sections 68 69 70. One or all of the sections may be provided with a double set of connections, as indicated at 67 and 71 on section 70, one set being designed for moderate heating and the other for superheating for toasting bread and for like purposes. The top 72 of the ice-chest 57 projects from below the china-closet 58 and together with the hot-plate 59 forms a table or carrier on which articles may be arranged in the kitchen and when ready for the dining-room may be brought thereinto by simply opening the door 11 and then turning the revoluble device on its pivot.

It is to be noted that the partition between the kitchen and dining apartments 2 and 3, respectively, is formed of three sections—viz., the stationary section 39, having an opening 39' therein, the section or panel 54 in said opening pivoted intermediate its edges, and the intermediate panel or door 11, held by the stationary section and combined with the revoluble or reversible pivoted section or panel 54 to form a closure for the opening 39'. The panel 54 forms a jamb for the door 11. The two movable sections 11 and 54 of said partition are preferably made to appear alike, so that when the refrigerator is in the kitchen and the door-section 11 is closed the two sections 11 and 54 present the appearance of double sliding doors.

In practical use the housewife or maid in preparing the vegetables or meats for the table may cut off the refuse or scraps on the shelf 31, and then by swinging the garbage-can holder in to bring the can 33 beneath the edge of the shelf, as shown in dotted lines in Fig. 1, can scrape the refuse into the garbage-can and then close it into its closet or receiver. The food prepared on the shelf 31 may be placed on the shelf 38' of the kitchen-cabinet, and foods from the pantry may also be placed on said shelf ready to be put upon the revoluble device 37 at a moment's notice, in the meantime leaving the top of the refrigerator and the hot-plate free for keeping or preparing hot or warm articles of food. By turning the appropriate electrical switch the current may be turned on and the hot-plate 59 will become heated, and warm foods from the range may be readily placed thereon while the device is swung adjacent the range. Then when all the foods are ready, the door 11 being still closed, the attendant may, while standing in the way 12', transfer the cold foods from the shelf of the kitchen-cabinet onto the shelf or refrigerator-top of the revoluble device. When everything is properly arranged on the hot-plate and refrigerator-top, the door 11 may be slid back far enough to allow the revoluble device to be reversed to carry the refrigerator and hot-plate into the dining-room, thus bringing the foods, refrigerator, hot-plate, and china all into the dining-room with but little, if any, noticeable disturbance. In clearing the dining-table (not shown) the reverse operation will be gone through with. The refuse from the table may be transported readily to the garbage-can, which will be swung into the kitchen for that purpose. The necessary access to the garbage-can from time to time is gained as required without danger of contaminating the atmosphere of the kitchen, for the reason that when the door 32' of the garbage-can carrier 32 is swung open and the can 33 is open within the kitchen the hot air from the kitchen passing the open mouth of the can to the ventilator 35 will carry any odors or effluvia from the mouth of the can up through the ventilator. If it is desired to allow a passage into the kitchen from the dining-apartment without exposing the kitchen to view, the panel 54 can be partially revolved to open a way between it and the wall while the edge of the door is against the side of the ice-chest and china-closet. By this means the major part of the kitchen is excluded from view, the way into the kitchen being next the wall.

The flour-bin 73 in the kitchen-cabinet has a sifter 74 and a measuring-gage 75, so that the attendant can measure flour directly onto the shelf or bread-board 76 of said cabinet, thus dispensing with the necessity of using measures or dippers for handling the flour.

77 is a hot-plate in the china-closet for heating plates which may be set in the compartments of said closet. 67' designates a switch for turning electric current onto said hot-plates.

78 is an electrical plate fastened to the kitchen-cabinet to enable the attendant to heat lard or other materials and have the same directly at hand. 67" designates an electric switch or key for turning on and off the current from said plate 78.

79 is a hot-plate in the shelf of the kitchen-cabinet, a circuit for which is turned on and off by a key 67'''.

What I claim is—

1. A kitchen-apartment having a wall with an outside exposure along a portion of one side, and having a garbage-can door in said side, a pantry-apartment along a portion of the same side and forming an angle with said wall, a dining-apartment along a side adjoining the pantry-apartment side, doors spaced apart and communicating between the kitchen, pantry and dining apartments, respectively; a kitchen-cabinet in the space between said doors, a shelf spaced apart from the pantry-door, a garbage-can holder pivoted to swing below the shelf and below the space between the shelf and the pantry-door and through the outside wall of the kitchen, a holder and ventilator for the garbage-can arranged outside the kitchen, a combination lavatory, laundry and culinary apparatus arranged along the same side of the kitchen with the shelf and garbage-can, heating means arranged on the opposite side of the kitchen; ironing apparatus between the laundry apparatus and the heating means, and a revoluble device forming a part of the wall of the dining-room and provided with an ice-chest, hot-plate and china-closet and adapted to revolve into closer proximity with the kitchen-cabinet and through the door communicating between the kitchen and the dining-apartment.

2. A kitchen-apartment having heating appliances on one side; lavatory, laundry and culinary appliances on the other side; an ironing-board hinged to the wall between the same, a shelf at the wall opposite the heating appliances, a garbage-can holder swinging through said wall and beneath said shelf and provided with a panel for closing the opening in the wall through which it swings, a garbage-can receiver outside the wall, a ventilator opening up from the top of said receiver, a dining-apartment at the end of the kitchen opposite the ironing-board, a door leading from the kitchen into the dining-apartment, and a revoluble device forming a section of the partition between the kitchen and dining apartments and arranged to revolve through the door and to alternately project into the kitchen and dining apartments.

3. Kitchen, pantry and dining apartments, the pantry and dining apartments adjoining each other at one end of the kitchen, cooking and laundry appliances at the side and opposite the pantry and dining apartments, doors communicating between the kitchen and the pantry and dining apartments, a support for dishes and food between said doors, and a revoluble device adapted to carry food and dishes through the door and to form a jamb for the door.

4. Kitchen and dining apartments, double doors between said apartments, one being pivoted and the other mounted to close against the same, the pivoted door being provided on one side with a refrigerator and a china-closet and adapted to carry the same into the kitchen and dining-room, alternatively.

5. A kitchen-apartment, a dining-apartment adjoining the same, a partition between the apartments comprising three sections, one of said sections being a wall-pocket, another section being a pivoted panel, and the intermediate section being a door sliding into said pocket and against said panel.

6. A kitchen-apartment, a dining-apartment, a partition between said apartments comprising three sections, one of which is stationary, another section being revoluble, and the intermediate section being a door held by the stationary section and closing against the edge of the revoluble section.

7. A kitchen-apartment, a dining-apartment, a partition between said apartments comprising a stationary section, a revoluble section, and an intermediate section held by the stationary section and closing against the revoluble section, a cabinet against the stationary section, the same being provided with a shelf, and a shelf carried by the revoluble section, a passage being provided between said shelves.

8. Two apartments, a sectional partition between said apartments, one of the sections comprising a door and another section being adjacent a wall pertaining to both apartments and provided on one side with a projecting device adapted to revolve through the door-opening and to stop against said wall in the apartments, respectively.

9. A wall, an upright jamb on the wall, a base-board or the like on the wall forming a stop at either side of the jamb, and a revoluble device pivotally mounted to stop against said jamb and base-board or the like, and arranged to revolve to bring one and the other side against said jamb and stop.

10. A kitchen-apartment provided with heating appliances at one side thereof, a dining-apartment adjoining the kitchen-apartment, a partition between said apartments, a section of said partition being formed of a door, and another section being formed of a panel pivoted at its mid-width, and a body of considerable thickness fastened to said panel, said door closing against said body when said panel is partially revolved to leave an opening between the apartments.

11. The combination of two apartments, a panel pivoted reversibly between the apartments and provided with a refrigerator and an electric heater on one side, pivots for said panel, electrical wires through the upper pivot for the heater, and a drain-pipe through the lower pivot for draining the refrigerator.

12. The partition comprising a section having an opening therein, a panel adapted to close a portion of said opening and provided with a pivot intermediate its edges, and a door closing another portion of said opening.

13. The partition comprising a section having an opening, a section pivoted in said opening by pivots arranged intermediate its edges, and a sliding door, the door and panel forming a closure for said opening.

In testimony whereof I have hereunto set my hand, at Los Angeles, California, this 25th day of July, 1905.

WILLARD C. JAMES.

In presence of—
   JAMES R. TOWNSEND,
   JULIA TOWNSEND.